April 14, 1970   R. G. WALKER   3,505,721
MACHINE AND SET-UP TOOL THEREFOR
Filed March 4, 1968   4 Sheets-Sheet 1

INVENTOR.
ROBERT G. WALKER
BY
Jeffers and Young
ATTORNEYS

INVENTOR.
ROBERT G. WALKER
BY
Jeffers and Young
ATTORNEYS

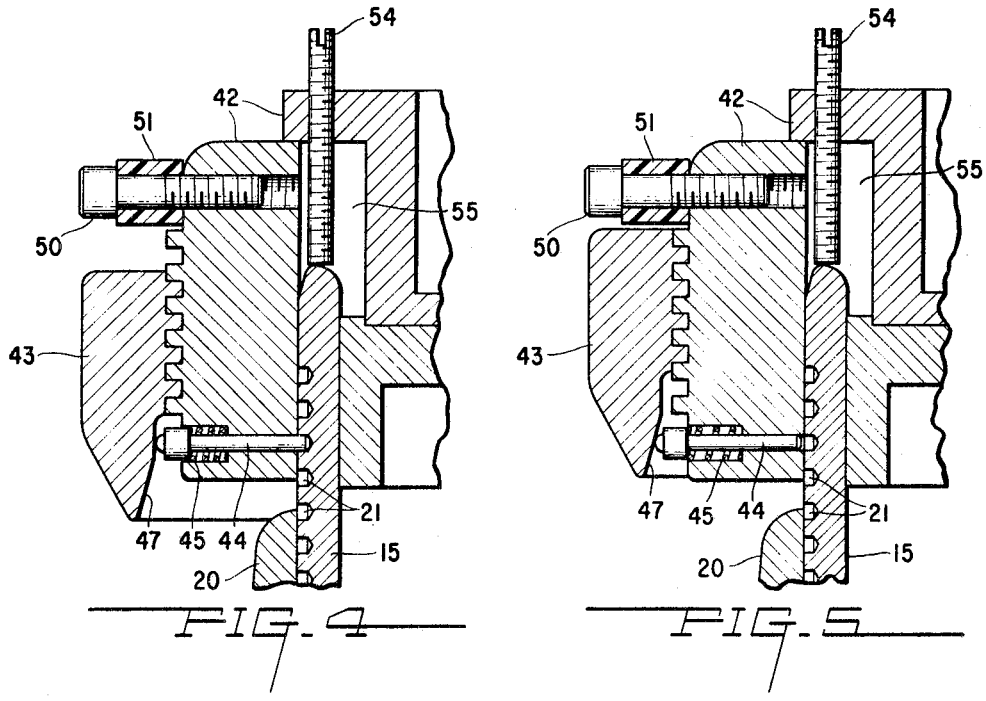
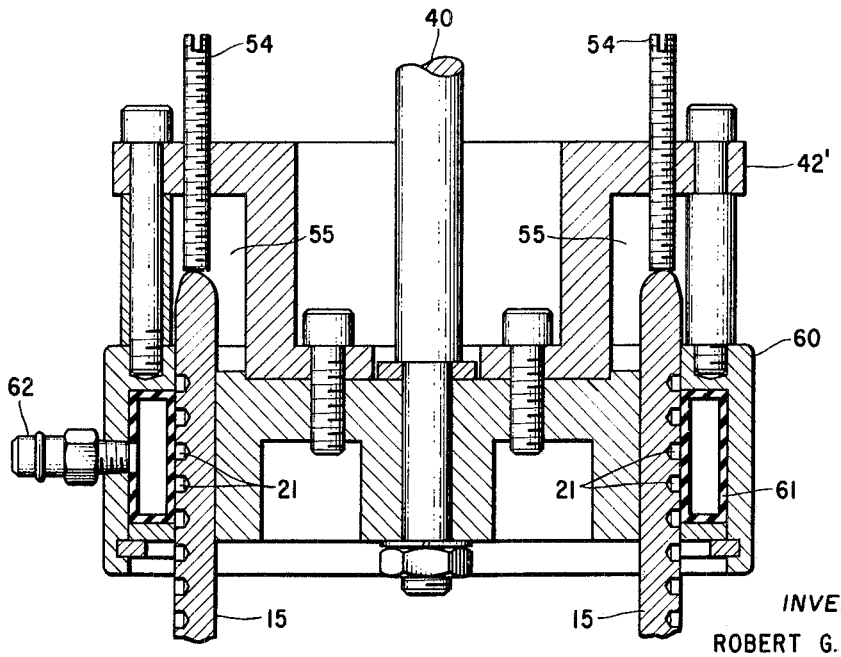

United States Patent Office 3,505,721
Patented Apr. 14, 1970

3,505,721
MACHINE AND SET-UP TOOL THEREFOR
Robert G. Walker, Fort Wayne, Ind., assignor to Industra Products, Inc., Fort Wayne, Ind., a corporation of Indiana
Filed Mar. 4, 1968, Ser. No. 710,329
Int. Cl. H02k 15/06
U.S. Cl. 29—205    16 Claims

ABSTRACT OF THE DISCLOSURE

The fingers of a coil placing machine are made adjustable, and are held or released by locking means. The fingers can be adjusted for various lamination stack heights by a set-up tool mounted on the coil placing machine. The set-up tool also has locking means which selectively engage each of the fingers when the set-up tool is in position. With the set-up tool locking means engaging the fingers, the coil placing machine locking means are released. The set-up tool is moved so that the fingers are moved to a position where the fingers can accommodate windings for the desired lamination stack height.

CROSS REFERENCE TO RELATED APPLICATIONS

The coil placing machine and set-up tool of this application are an improvement over the "Coil Assembling Apparatus" described and illustrated in Patent No. 3,324,536 granted to Donald E. Hill on June 13, 1967.

BACKGROUND OF THE INVENTION

My invention relates to a coil placing machine and a set-up tool therefor, and particularly to a new and improved coil placing machine having adjustable fingers and a set-up tool for simultaneously adjusting all of the fingers of the coil placing machine to accommodate a different lamination stack height.

Coil placing machines are utilized in the assembly of stator coils or windings on the laminated stator of an electric motor. A typical coil placing machine comprises a base having a plurality of fingers extending in generally parallel directions from the base in a configuration that matches the structure of the stator on which coils are to be placed. A movable stripper is positioned inside the fingers. The coils of wire are placed on the fingers, and the stator is positioned around the fingers. The stripper is then moved upward. In moving upward, the stripper forces the coils of wire upward so that the vertical sides of the coils are pushed into the stator slots, and so that the lower sides of the coils are positioned against the bottom of the stator. The upper sides of the coils are brought to rest at a point above the stator, and may be pushed over and against the top of the stator to complete the positioning of the coils on the stator. After the coils are positioned on the stator, the assembled coils and stator are removed. Additional coils can be placed on the fingers, and another stator provided with these additional coils. The number and length of the fingers of such a coil placing machine vary with the stator configurations. Those coils whose vertical sides are farther apart must be positioned around or outside of those coils whose vertical sides are closer together. Hence, those fingers which guide the outside coils should be longer than those fingers which guide the inside coils.

In order to accommodate the coils for various sizes of stators, the fingers on a coil placing machine are generally adjustable. Previously, the fingers were adjusted or moved by means of one or more set screws which hold the fingers on the base of the coil placing machine. If, for example, the stator for a four pole motor were to be provided with windings, the fingers would be adjusted to provide four groups of relatively short or low fingers positioned at the center of the four stator poles. The fingers for each outwardly successive coil of each pole would be adjusted to be longer or higher. Setting the fingers of a coil placing machine for such a four pole motor required appreciable time because it was difficult to get to the fingers and their holding or locking means. If the stack height of the motor had to be changed in order to accommodate more or less laminations in the stator, it would be necessary for each of the individual fingers to be lengthened or shortened to accommodate the change in stack height. Such a change is time consuming and difficult, so that the time and expense of manufacture for such a motor is increased.

Accordingly, an object of my invention is to provide a new and improved coil placing machine having fingers which can be rapidly and easily adjusted.

Another object of my invention is to provide a rapidly operating set-up tool for adjusting the fingers of a coil placing machine.

Another object of my invention is to provide a coil placing machine that has locking means which can be easily and quickly operated to hold or release the fingers of the coil placing machine.

Another object of my invention is to provide an improved coil placing machine and set-up tool for increasing or decreasing the length of the fingers of a coil placing machine.

Another object of my invention is to provide a new and improved set-up tool that is easily mounted on a coil placing machine to change the length of selected ones or all of the fingers of the coil placing machine quickly and easily.

Another object of my invention is to provide a new and improved coil placing machine having finger retaining and locking means to permit selected ones or all of the fingers of the placing machine to be adjusted quickly and easily.

Another object of my invention is to provide an improved set-up tool that simultaneously and quickly changes the length of the fingers of a coil placing machine as a unit and that retains the relative length between the ends of the fingers.

SUMMARY OF THE INVENTION

Briefly, these and other objects are achieved in accordance with my invention by a coil placing machine having a plurality of fingers positioned in a desired configuration in slots in a housing. Locking means are positioned around the fingers and housing, and can be operated to release or hold the fingers. The locking means has spring means which frictionally hold the fingers in a given position even though the locking means are operated to release the fingers. However, the fingers can be adjusted by an external force that is sufficient to overcome the frictional force of the spring means. These and other objects are also achieved in accordance with my invention by a set-up tool having a support for removably mounting the set-up tool on a coil placing machine. A housing is adjustably mounted on the support. Locking means are mounted on the housing in a configuration substantially identical to the configuration of the fingers of the coil placing machine. The locking means are selectively operated to lock the housing to each finger of the coil placing machine.

When the fingers of a coil placing machine are to be adjusted or changed, the set-up tool is mounted on the coil placing machine so that the housing is adjacent the ends of the fingers. The set-up tool locking means are then operated to lock the housing to the fingers. The placing machine locking means are then operated to release the fingers at the coil placing machine so that the housing and fingers may be adjusted toward or away from the coil placing machine to provide the fingers with the desired length. When the fingers are adjusted to the desired length, they are again locked to the coil placing machine. The locking means on the housing is then released, and the set-up tool is removed from the coil placing machine to leave the fingers with the desired new adjusted length. In one embodiment of my invention, the locking means may comprise a mechanically rotated locking ring. In another embodiment of my invention, the locking means may comprise pressure operated pistons or a pressure operated locking ring.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIGURES 4 and 5 show detailed cross sectional views of the locking means on the housing of my set-up tool in a locked position and an unlocked position respectively; and FIGURE 6 shows a cross sectional view of another embodiment of the locking means on the housing of my set-up tool.

DESCRIPTION OF THE PREFERRED EMBODIMENTS

Figure 1:
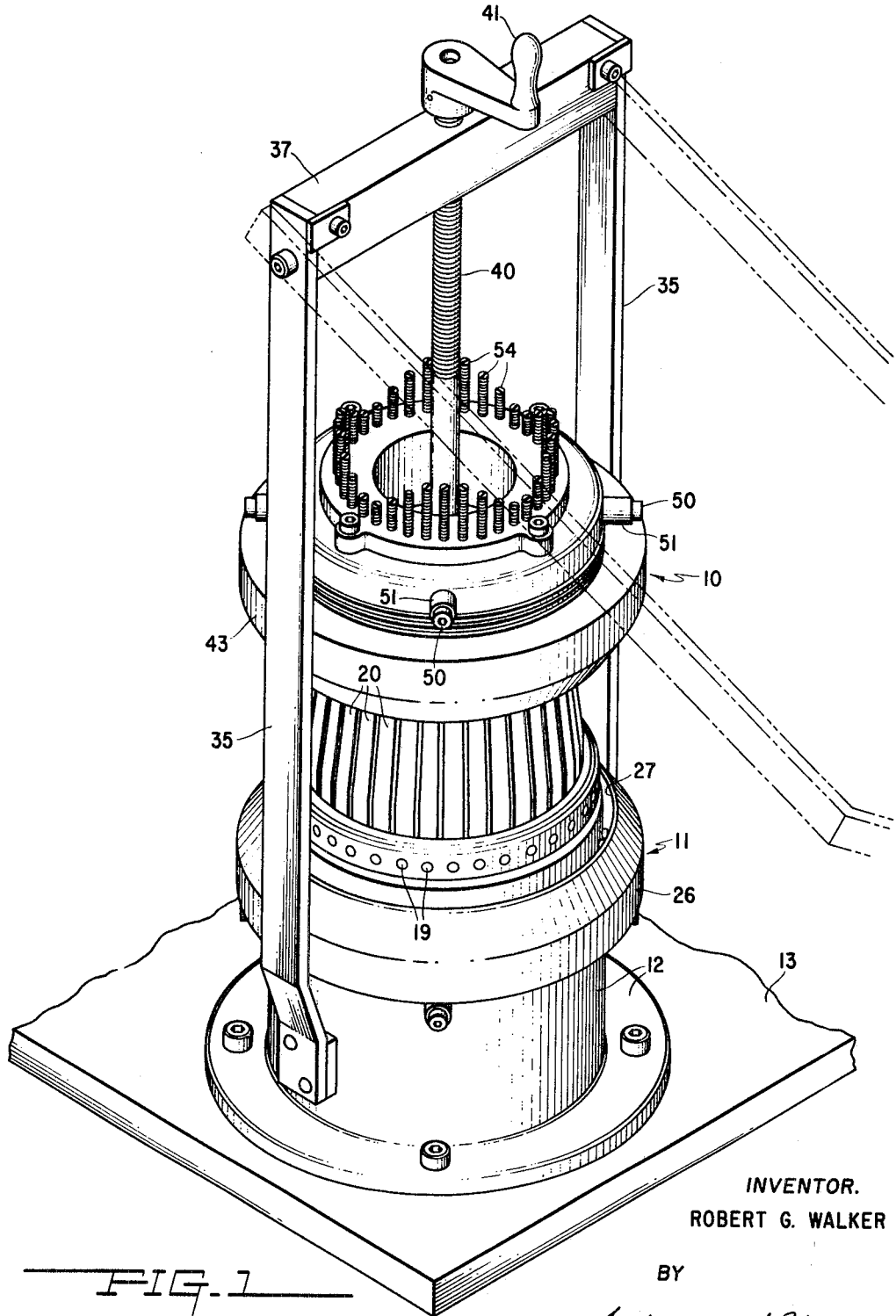
FIGURE 1 shows a perspective view of a set-up tool in position on a coil placing machine in accordance with my invention.
Figure 2:
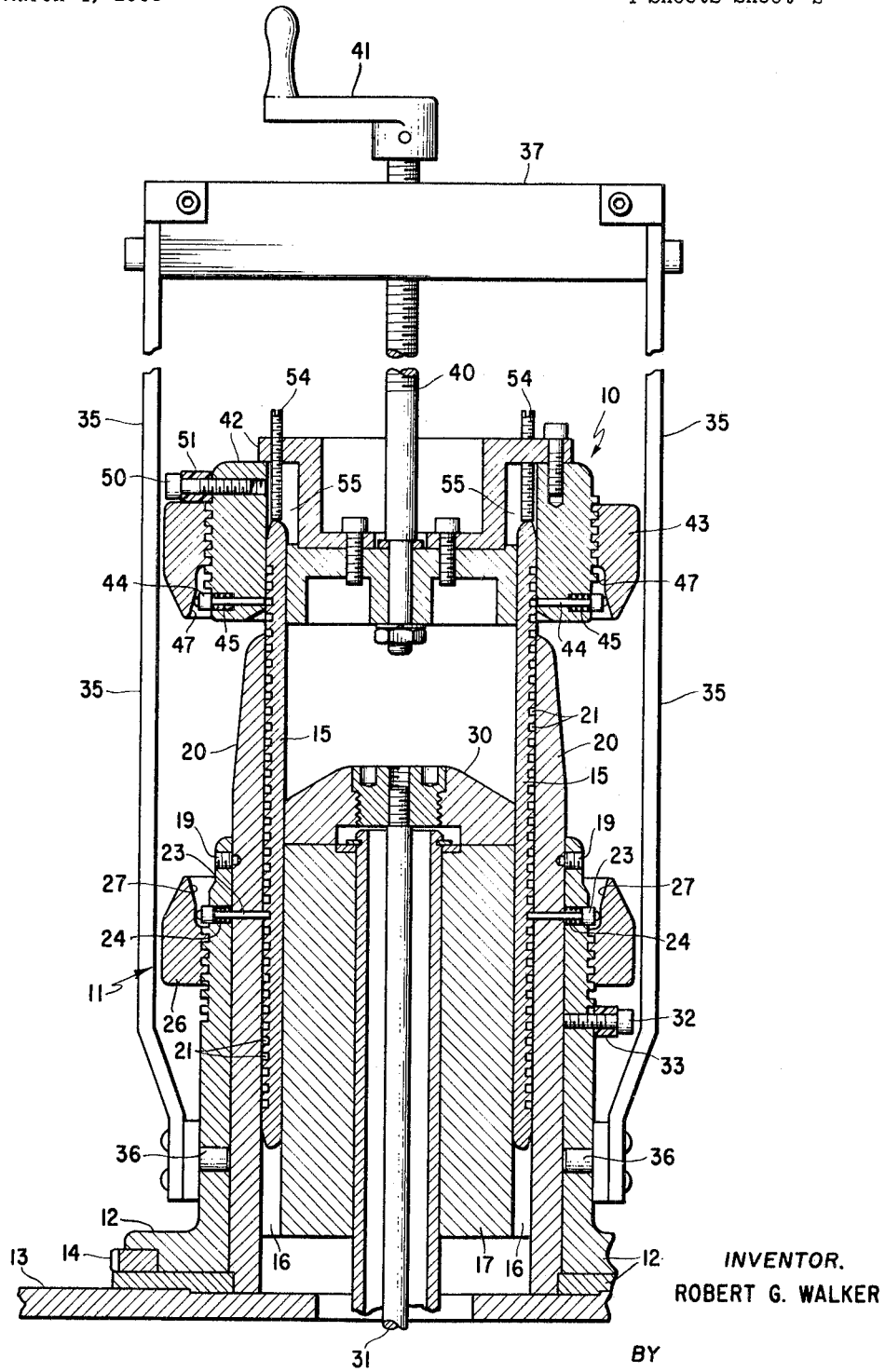
FIGURE 2 shows a longitudinal cross sectional view of my coil placing machine and set-up tool of FIGURE 1, with the housing unlocked from the upper ends of the fingers of the coil placing machine, and with the lower ends of the fingers locked to the coil placing machine.
Figure 3:
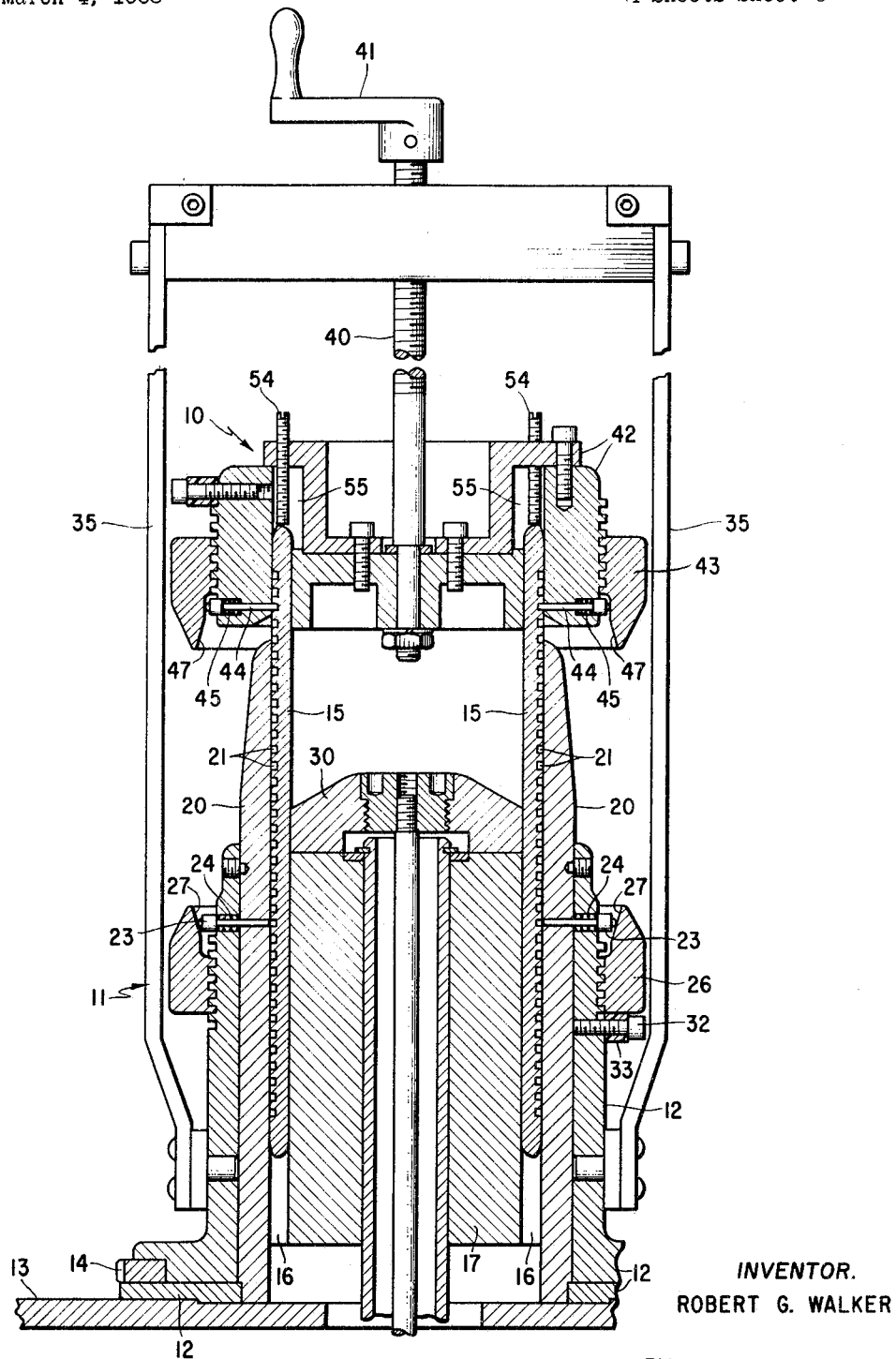
FIGURE 3 shows a longitudinal cross sectional view of my coil placing machine and set-up tool of FIGURE 1 with the housing locked to the upper ends of the fingers of the coil placing machine, and with the lower ends of the fingers unlocked from the coil placing machine.

With reference to FIGURES 1 and 2, I have shown a set-up tool 10 and a coil placing machine 11 in accordance with my invention. The coil placing machine 11 comprises a housing 12 which may be fixedly mounted on a base 13, or mounted on the base 13 and rotated by a gear 14. A plurality of elongated fingers 15 (visible in FIGURE 2) have their lower ends positioned in slots 16 in a finger housing 17 which is positioned inside the housing 12. These fingers 15 are positioned in a configuration which matches the configuration of the electrical device on which coils or windings are to be placed, and extend longitudinally from the finger housing 17 in a generally parallel direction. If the electrical device is a stator, the fingers 15 are generally arranged in a circular configuration (as shown in the drawing) so that one finger 15 is positioned at each stator tooth (that portion of the stator between which a slot is formed). A wedge guide 20 is respectively positioned on the outer side of each of the fingers 15. The wedge guides 20 are held in a fixed position inside the housing 12 by set screws 19. Each of the fingers 15 is provided with a plurality of locking holes 21 which extend inward from the outer face of the fingers 15 toward, but preferably not through, the inner face of the fingers 15. These locking holes 21 provide means for locking the fingers 15 to the housing 12, and also provide means for locking the fingers 15 to the set-up tool 10 as will be explained. A plurality of locking pins 23, one for each finger 15, are radially positioned in the housing 12. The locking pins 23 extend from a point outside the housing 12 radially inward through the wedge guides 20 to engage one of the locking holes 21 in each of the respective fingers 15. Each of the locking pins 23 is provided with mechanical urging means such as a spring 24 which is compressed between the enlarged ends of the pins 23 and the outer faces of the wedge guides 20 to normally urge the pins 23 outward and away from engagement with the locking holes 21 of its respective finger 15. Locking means in the form of a cylindrical collar or locking ring 26 are threadedly mounted on the outside of the housing 12. With the locking ring 26 threaded upward to the position shown in FIGURE 2, its internal camming face 27 urges the locking pins 23 into the locking holes 21 to lock the fingers 15 in a fixed relation between the finger housing 17 and the housing 12. If the locking ring 26 is threaded downward from the position shown in FIGURE 2 to a position such as shown in FIGURE 3, the camming face 27 permits the springs 24 to urge the pins 23 outward from the locking holes 21 and unlock the fingers 15 from the finger housing 17 and the housing 12. While the fingers 15 are unlocked from the housing 12 and the finger housing 17, they do not move or slide (under gravitational force) in the slots 16. This is because the springs 24 are still compressed to some extent between the enlarged ends of the pins 23 and the wedge guides 20. This compression provides an inwardly directed force on each of the wedge guides 20 to force the wedge guides 20 against their respective fingers 15. Since the finger housing 17 is fixed, the fingers 15 are held against sliding because of their own weight or vibration, but can be moved or adjusted by an intentional force on the fingers 15. This feature is important and desirable where some of the fingers 15 are to be adjusted but others are to be left in the same position. The downward position of the locking ring 26 is limited or stopped by a suitable stop pin 32 which preferably has a low friction bushing or sleeve 33 that stops the locking ring 26 but prevents the locking ring 26 from binding against the stop pin 32. The stop pin 32 is desirable to prevent the locking ring 26 from being moved down so far that the locking pins 23 and springs 24 spring or fall out. A movable stripper 30 is positioned within the fingers 15, and is arranged for movement relative to the finger housing 17 and the housing 12 by a stripper rod 31.

When my coil placing machine 11 is used, a plurality of coils or windings are positioned on the fingers 15. When the coils are in position, the vertical sides of the coils are between the fingers 15 and hang down and outside the coil placing machine 11; the upper sides of the coils extend across and inside the fingers 15; and the lower sides of the coils extend across and outside the coil placing machine 11. A stator or other electrical structure is positioned around the fingers 15 with the stator slots between the fingers 15. The stripper 30 is then moved upward. As the stripper 30 moves upward, it engages the upper sides of the coils and pulls the coils upward so that the vertical sides of the coils are forced into the stator slots. The upper sides of the coils are pulled to the top of the stator, and the lower sides of the coils are pulled against the bottom of the stator. When the operation is completed, the upper sides of the coils are pulled outward and against the upper face or surface of the stator, and the placement of the coils is thus completed.

As is known in the coil placing art, a set of coils is wound or arranged to provide each pole of a motor stator. The set may comprise an inner coil which is positioned in a first pair of adjacent stator slots, a second coil which is positioned in two stator slots outwardly adjacent the first pair of stator slots, and additional outer coils which are positioned in outwardly adjacent stator slots. There will be one such set of coils for each pole of the motor stator, and there are usually two or more poles on each motor stator. Since the coils must be positioned close to outer surfaces of the stator ends, each coil is preferably smaller than the next outwardly adjacent coil. For this reason, the fingers 15 are of different lengths. Generally, the fingers 15 increase in length for succeeding outer coils. Thus, for a set of coils, a coil placing machine has a pair of short inner fingers and has longer fingers adjacent the inner fingers. The machine has additional fingers for each set of coils. In order that the coils of each set be placed smoothly and accurately, the lengths of the fingers 15 should be accurately and carefully determined. This determination may require some trial and error. When moved downward, the locking ring 26 permits the springs 24 to urge the locking pins 23 outward and unlock or release the fingers 15 easily and quickly. The fingers 15 maintain their former position because of the force from the springs 24, but can be individually adjusted up or down by a moderate force on the end of the desired finger 15. When the fingers 15 have been adjusted, they may be locked by moving the locking ring 26 upward.

Once the proper lengths for the fingers 15 have been determined, it is desirable to change the finger lengths so that the fingers continue to function properly for a given set of coils. However, if the stator length is to be changed but the number of poles and coils is to be kept the same, then it is necessary that the lengths of the fingers be increased or decreased. The lengths would be increased for an increased stator length, and decreased for a decreased stator length. This change of the lengths of the fingers 15 on the coil placing machine 11 has been a time consuming and difficult job. Further, even after the lengths of all of the fingers 15 have been adjusted for a new stator length, their relative lengths may be varied slightly. If the relative lengths of the fingers 15 have varied, the coils may be ruined when they are pushed into the stator slots by the stripper 30.

The set-up tool 10 in accordance with my invention provides an improved and easy device for changing selected ones or all of the lengths of the fingers 15 once the fingers 15 have been provided with the desired relative lengths. The set-up tool 10 is supported by arms or supports 35 which are removably attached to the lower part of the housing 12 by any suitable means, such as mounting pins 36 which fit into suitable openings in the housing 12. A cross bar or yoke 37 is pivotally fastened between the arms 35 at the top to permit the arms 35 to be swung out or pivoted as indicated by the phantom lines in FIGURE 1. A threaded adjusting rod 40 is fitted into a threaded hole in the cross bar 37, and may be turned or adjusted by any suitable means such as a handle 41. A set-up tool housing 42 is mounted on the adjusting rod 40 so that the rod 40 can turn with respect to the housing 42. The housing 42 has a circular threaded exterior on which a circular locking ring 43 is threaded. A plurality of locking pins 44 are radially positioned in the housing 42, and are respectively biased in an outward direction by suitable biasing means such as a compression spring 45. The locking pins 44 are positioned around the housing 42 so as to engage the locking holes 21 in the fingers 15. When the locking ring 43 is threaded to an upward position as shown in FIG-URE 2, an interior camming surface 47 permits the pins 44 to be urged outward by the springs 45. The upward position of the locking ring 43 is limited or stopped by a suitable stop pin 50 which preferably has a low friction bushing or sleeve 51 that stops the locking ring 43 but prevents the locking ring 43 from binding against the stop pin 50.

The set-up tool housing 42 also comprises a plurality of adjustable gauge pins 54 which are arranged in a configuration substantially identical to the configuration of the fingers 15, and which can be adjusted up and down in a circular recess 55 to determine the relative length of the fingers 15. I prefer that the gauge pins 54 be threaded into the housing 42. The gauge pins 54 are adjusted in accordance with the respective lengths which the fingers 15 should have for a given set of coils on a stator or other structure. Once the gauge pins 54 are set for a particular coil configuration, they are left at that setting. FIGURE 1 shows the gauge pins 54 arranged for a four pole motor stator with each pole having a set of coils or windings. The fingers 15 have relative lengths corresponding to the relative lengths of the gauge pins 54 so that the coils can be slipped over the fingers 15 against the upper surface of the stator at the appropriate location and provide a compact winding structure.

When the fingers 15 are to be moved in or out as a group with respect to the housing 12, the locking ring 43 of the set-up tool 10 is rotated to an upward position as shown in FIGURES 2 and 5 so that the locking pins 44 are urged outward by their respective springs 45. The set-up tool 10 is then placed in position on the housing 12 with the mounting pins 36 positioned in the housing 12. The cross bar 37 is supported on the arms 35 above the coil placing machine 11. The handle 41 is turned so that the set-up tool housing 42 is lowered until the gauge pins 54 engage their respective fingers 15 in the recess 55. The set-up tool 10 and the coil placing machine 11 then have the relative positions as shown in FIGURE 2 and in FIG-URE 5. In FIGURE 2, it will be noted that the locking ring 26 on the coil placing machine 11 is at its upper position so that the locking pins 23 are in the locking holes 21 in the fingers 15. The locking ring 43 of the set-up tool 10 is then rotated to a lower position so that its camming face 47 engages the outer ends of the locking pins 44 and urges them into respective holes 21 in the fingers 15. This condition of the locking ring 43 and the locking pins 44 is shown in FIGURE 3 and in FIGURE 4. At this point, the set-up tool 10 is firmly locked to each of the fingers 15. Then, in order that the fingers 15 can be moved in or out of the housing 12, the locking ring 26 of the coil placing machine 11 is rotated to a lower position as shown in FIGURE 3 so that the springs 24 can urge the locking pins 23 to an outward position. At this point, the fingers 15 are then free to move with respect to the housing 12 of the coil placing machine 11.

Appropriate movement of the fingers 15 as a group or unit, with their relative lengths maintained, can then be made by rotating the handle 41 in the appropriate direction. After the fingers 15 are moved up or down to the desired point, the locking ring 26 is rotated and moved upward to urge the locking pins 23 into the holes 21 of the fingers 15. The fingers 15 are thus locked to the housing 12 again with a newly adjusted length. The set-up tool 10 can then be removed by first rotating the locking ring 43 upward to the position shown in FIGURE 2 and in FIGURE 5. This permits the springs 45 to urge the locking pins 44 outward, so that the pins 44 are disengaged from the holes 21 in the fingers 15. The housing 42 of the set-up tool 10 can then be moved upward and away from the fingers 15 by rotating the handle 41. When the housing 42 is separated or cleared from the fingers 15, the entire set-up tool 10 can be removed by disengaging the pins 36 from the housing 12.

Thus, it will be seen that my set-up tool 10 permits relatively rapid and easy adjustment of the fingers of a coil placing machine, while maintaining the desired relative lengths of the fingers 15 with respect to each other. This permits rapid change of the coil placing machine for a different stack height or number of laminations.

The coil placing machine 11 shown in FIGURES 1 through 5 utilizes a locking ring 26 which is rotated to provide a camming action of all its locking pins 23. Likewise, the set-up tool 10 utilizes a locking ring 43 which is rotated to provide a camming action of all its locking pins 44. Other means can be provided for selectively actuating individual ones of the locking pins 23, 44. These means may comprise a fluid operated piston positioned in an operating cylinder and serving as the locking pins 23, 44. The pistons could have a normal position that is either inward and locking or outward and releasing, and could be moved to the other position by fluid pressure in the operating cylinders. This fluid pressure can be individually applied to selected cylinders so that only selected fingers are released. FIGURE 6 shows another embodiment for locking a set-up tool housing 42' to the fingers 15. The housing 42' is similar to the housing 42 shown in FIGURES 1 through 5, and corresponding parts have the same reference numerals. The housing 42' comprises a plurality of gauge pins 54 arranged in the proper or desired configuration. However, instead of a rotatable locking ring, the housing 42' is provided with a clamping housing 60 which encircles the housing 42', and which comprises a generally cylindrical, resilient chamber 61 surrounding the fingers 15. The chamber 61 is airtight, and is provided with a suitable air inlet 62 to which air or liquid under pressure is supplied. The material forming the chamber 61 is a relatively strong, yet resilient material which will deform under pressure. When pressure such as air or liquid is applied through the inlet 62 to the chamber 61, it tends to urge the inner surface of the chamber 61 firmly against the fingers 15 and into the holes 21. This provides a strong engagement between the chamber 61 and the fingers 15. With the housing 42' clamped to the fingers 15 by the chamber 61, the fingers 15 can be moved inward or outward by appropriately moving the housing 42'. After the fingers 15 are positioned at the desired location, they may be released by removing the pressure from the chamber 61 and the set-up tool removed. Similar structures or arrangements can be used to lock the fingers 15 with respect to the coil placing machine 11. However, a mechanical means, such as the locking pins 23, is preferred for the coil placing machine 11 since it may have to retain a fixed position for a relatively long length of time.

It will thus be seen that my coil placing machine and set-up tool provide improved devices for rapidly adjusting the fingers in a coil placing machine and maintaining the desired relative lengths of the fingers during the overall adjustment. My placing machine and set-up tool permit the fingers 15 to be securely locked even though the holes 21 do not pass all of the way through the fingers 15. This is particularly advantageous since the sharp edges of a hole on the interior surface of the fingers 15 may damage the coils or their insulation. Persons skilled in the art will appreciate that modifications may be made. The holes 21 in the fingers may have any desired spacings. I prefer that the holes 21 be spaced different distances from the two ends of the fingers 15 to permit the fingers 15 to be reversed if a different incremental position is required. The locking pins 23 in the coil placing machine 11 and the locking pins 44 in the set-up tool 10 may be operated by other means than the springs 24, 45 shown. For example, the pins may be actuated by air in an inward and outward direction to provide rapid locking and unlocking. Also, the housings 42, 42' may be moved by other means beside the threaded rod 40 and the hand wheel or crank 41. The set-up tool 10 may also be provided with a different mounting structure in place of the arms 35 and the pins 36. The gauge pins 54 may be omitted if desired, or only two or three gauge pins may be used to align and position the set-up tool 10 on the fingers 15. Any selected number of locking pins 23, 44 may be operated for an adjustment of the fingers 15. And, some of the fingers 15 may be fixed at all times. Therefore, while my invention has been described with reference to particular embodiments, it is to be understood that modifications may be made without departing from the spirit of the invention or from the scope of the claims.

What I claim as new and desire to secure by Letters Patent of the United States is:

1. An improved coil placing machine comprising:
   (a) a base;
   (b) a housing mounted on said base, said housing having a plurality of finger receiving slots positioned therein in a predetermined configuration;
   (c) an elongated finger positioned in each of said finger receiving slots, each of said fingers having a plurality of locking holes on the outer face thereof;
   (d) a plurality of locking pins positioned in said housing, each of said pins extending from an outer portion of said housing inward toward a respective one of said fingers for engaging a locking hole therein;
   (e) and means associated with each of said locking pins for normally urging said locking pins in an outward direction to disengage each of said locking pins from its respective finger.

2. The coil placing machine of claim 1 and further comprising means associated with each of said locking pins for selectively urging each of said locking pins inward.

3. The coil placing machine of claim 1 wherein said outward urging means frictionally hold said fingers when said pins are disengaged from their respective fingers.

4. The coil placing machine of claim 3 and further comprising means associated with each of said locking pins for selectively urging each of said locking pins inward.

5. The coil placing machine of claim 2 wherein said inward urging means comprise a member threaded on said housing, said member having an internal camming surface which moves said pins inward to a locking position for one position of said camming surface and which permits said locking pins to move outward for another position of said camming surface.

6. The coil placing machine of claim 5 wherein said outward urging means comprise compression springs which frictionally hold said fingers when said pins are disengaged from their respective fingers.

7. The coil placing machine of claim 2 wherein said inward urging means comprise fluid pressure operating means.

8. An improved coil placing machine comprising:
   (a) a base;
   (b) a housing mounted on said base, said housing having a plurality of receiving slots positioned therein in a predetermined configuration;
   (c) an elongated finger positioned in each of said receiving slots adjacent the inner face thereof, each of said fingers having a plurality of locking holes on the outer face thereof;
   (d) a wedge guide positioned in each of said receiving slots between its respective finger and the outer face of said receiving slot;
   (e) a locking pin positioned in said housing adjacent each of said wedge guides and fingers, each of said locking pins having an enlarged outer head positioned outside of said housing and having an elongated portion extending from said outside through said housing and said wedge guide to a respective one of said fingers for engaging a locking hole therein;
   (f) an actuating surface positioned adjacent and outside of each of said enlarged heads of said locking pins for selectively urging said locking pins inward and for selectively permitting said locking pins to move outward a predetermined distance;
   (g) and a compression spring positioned around each of said locking pins between its respective wedge guide and enlarged head.

9. A set-up tool for moving the fingers of a coil placing machine having a plurality of fingers arranged in a predetermined configuration around a base housing and extending in a generally longitudinal and parallel direction, said set-up tool comprising:
   (a) support means for removably mounting said set-up tool on said coil placing machine;
   (b) a tool housing movably mounted on said support means;
   (c) a plurality of gauge pins mounted on said tool housing in a configuration substantially identical to said configuration of said fingers, said gauge pins adjustably extending in a generally longitudinal and parallel direction from said pin holder for engaging the ends of said fingers;
   (d) and locking means positioned on said pin holder along said gauge pin configuration for locking said tool housing to each of said fingers of said coil placing machine.

10. The set-up tool of claim 9 wherein said locking means comprise a plurality of radially positioned locking pins around said configuration for engaging said fingers.

11. The set-up tool of claim 9 wherein said locking means comprise a resilient member extending around said configuration and being deformable for pressing against and engaging said fingers.

12. A set-up tool for adjusting the length of fingers positioned on a machine in a configuration to place coils on an electrical device, said set-up tool comprising:
  (a) means for removably mounting said set-up tool above said machine;
  (b) a housing movably mounted on said mounting means;
  (c) and actuatable locking means positioned on said housing in said configuration for engaging selected ones of said fingers and locking said fingers to said housing.

13. The set-up tool of claim 12 wherein said housing is arranged to receive said ends of said fingers, and said locking means engage said fingers and lock said fingers to said housing.

14. The set-up tool of claim 13 wherein said locking means comprise pins and a locking ring having a camming face for simultaneously engaging and urging said pins in a locking direction against said fingers.

15. The set-up tool of claim 13 wherein said locking means comprise a resilient chamber having an inlet for a source of fluid and having a deformable surface for simultaneously urging said deformable surface in a locking direction against said fingers.

16. The set-up tool of claim 13 wherein said locking means comprise a plurality of radially positioned locking pins around said configuration for engaging said fingers, and selectively operated fluid pressure operating means for moving said locking pins inward to engage and lock said fingers and outward to disengage and unlock said fingers.

References Cited
UNITED STATES PATENTS

| | | | |
|---|---|---|---|
| 2,873,514 | 2/1959 | Mills | 29—205 |
| 3,324,536 | 6/1967 | Hill | 29—205 |

THOMAS H. EAGER, Primary Examiner